(12) United States Patent
Bassfeld

(10) Patent No.: US 11,492,770 B2
(45) Date of Patent: Nov. 8, 2022

(54) WEED CONTROL AT HIGH SPEED

(71) Applicant: Bayer Aktiengesellschaft, Leverkusen (DE)

(72) Inventor: Hinnerk Bassfeld, Lienen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 377 days.

(21) Appl. No.: 16/613,046

(22) PCT Filed: May 11, 2018

(86) PCT No.: PCT/EP2018/062271
§ 371 (c)(1),
(2) Date: Nov. 12, 2019

(87) PCT Pub. No.: WO2018/210702
PCT Pub. Date: Nov. 22, 2018

(65) Prior Publication Data
US 2020/0199837 A1 Jun. 25, 2020

(30) Foreign Application Priority Data
May 17, 2017 (EP) .................................... 17171521

(51) Int. Cl.
*E01H 11/00* (2006.01)
*A01M 21/04* (2006.01)
(Continued)

(52) U.S. Cl.
CPC ........... *E01H 11/00* (2013.01); *A01M 21/043* (2013.01); *A01M 21/046* (2013.01);
(Continued)

(58) Field of Classification Search
CPC ..... E01H 11/00; A01M 7/0089; A01M 21/04; A01M 21/043; A01M 21/046;
(Continued)

(56) References Cited

U.S. PATENT DOCUMENTS 1,671,849 A * 5/1928 Williams .............. E01B 27/023
37/105
1,832,030 A * 11/1931 Kirkland ................. E01H 11/00
239/173

(Continued)

FOREIGN PATENT DOCUMENTS

| CN | 104273110 A | 1/2015 |
| CN | 104430274 A1 | 3/2015 |

(Continued)

OTHER PUBLICATIONS

Japanese Office Action dated Feb. 4, 2022 for Japanese Patent Application No. 2019-563526 with English translation (5 pages).

(Continued)

*Primary Examiner* — Zachary L Kuhfuss
(74) *Attorney, Agent, or Firm* — McBee Moore & Vanik IP, LLC

(57) ABSTRACT

An apparatus and a method for increasing the movement speed of the rail vehicle while carrying out measures for controlling weeds on track systems. A rail vehicle equipped with an apparatus for increasing the movement speed of the rail vehicle while carrying out measures for controlling weeds on track systems.

19 Claims, 2 Drawing Sheets

(51) Int. Cl.
  *B05B 9/04* (2006.01)
  *B05B 9/06* (2006.01)
  *B61L 23/04* (2006.01)
  *B61L 25/02* (2006.01)
  *B61D 15/00* (2006.01)

(52) U.S. Cl.
  CPC .............. *B05B 9/0423* (2013.01); *B05B 9/06* (2013.01); *B61L 23/041* (2013.01); *B61D 15/00* (2013.01); *B61L 25/021* (2013.01); *B61L 25/025* (2013.01)

(58) Field of Classification Search
  CPC ....... B05B 12/122; B05B 13/005; B05B 9/06; B61D 15/00; B61L 23/041
  USPC ......................................................... 239/173
  See application file for complete search history.

(56) References Cited

U.S. PATENT DOCUMENTS

| | | | |
|---|---|---|---|
| 1,925,164 A * | 9/1933 | Woolery ................. | E01H 11/00 126/271.2 A |
| 2,484,443 A * | 10/1949 | Baker ................. | A01M 21/046 47/1.3 |
| 2,485,391 A | 10/1949 | Lasseigne | |
| 2,591,597 A * | 4/1952 | Opp .................... | A01M 21/046 47/1.3 |
| 2,986,006 A * | 5/1961 | Cox ........................ | E01H 11/00 74/102 |
| 4,177,603 A * | 12/1979 | Dykes ................. | A01M 21/046 47/1.3 |
| 4,230,280 A | 10/1980 | Leigh | |
| 5,768,823 A | 6/1998 | Nelson | |
| 6,010,079 A * | 1/2000 | Mayfield, Jr. ........... | E01H 11/00 239/165 |
| 6,065,686 A * | 5/2000 | Betts-Williams ... | A01M 7/0089 222/617 |
| 11,085,156 B2 * | 8/2021 | Serrat ................... | B05B 12/122 |
| 2006/0265946 A1 * | 11/2006 | Schwager ........... | A01M 21/046 47/1.3 |
| 2009/0226036 A1 | 9/2009 | Gaal | |
| 2016/0050902 A1 * | 2/2016 | Crisp .................... | A01M 19/00 43/124 |
| 2019/0223428 A1 * | 7/2019 | De Andrade Coutinho Filho ...... | E01H 11/00 |
| 2020/0011019 A1 * | 1/2020 | Serrat ................... | G06K 9/6245 |
| 2020/0095741 A1 * | 3/2020 | Baßeld ................. | B05B 12/004 |

FOREIGN PATENT DOCUMENTS

| | | | | |
|---|---|---|---|---|
| CN | 204860717 U | | 12/2015 | |
| CN | 106489673 A | | 3/2017 | |
| DE | 8911198 U1 | | 11/1989 | |
| EP | 0418453 A1 * | | 3/1991 | ............ E01H 11/00 |
| EP | 0418453 A1 | | 3/1991 | |
| EP | 1521885 B1 | | 5/2009 | |
| EP | 2728068 A1 * | | 5/2014 | ............ E01H 11/00 |
| GB | 2327231 A | | 1/1999 | |
| JP | H0383534 A | | 4/1991 | |
| JP | H0856546 A | | 3/1996 | |
| JP | H1042773 A | | 2/1998 | |
| WO | 2004005625 A1 | | 1/2004 | |
| WO | WO-2004005625 A1 * | | 1/2004 | ............ E01H 11/00 |

OTHER PUBLICATIONS

Chinese Office Action for the Application No. 201880032511.8, dated Jan. 30, 2022 (9 pages) with English translation only.

* cited by examiner

WEED CONTROL AT HIGH SPEED

CROSS REFERENCE TO RELATED APPLICATIONS

This application is a national stage application under 35 U.S.C. § 371 of International Application No. PCT/EP2018/062271, filed internationally on May 11, 2018, which claims the benefit of European Application No. 17171521.2, filed May 17, 2017.

FIELD OF THE INVENTION

The present invention relates to the technical field of weed control by means of a moving rail vehicle. An apparatus and a method for increasing the movement speed of the rail vehicle while carrying out measures for controlling weeds on track systems are the subject matter of the invention. A rail vehicle equipped with corresponding means is a further subject matter of the present invention.

BACKGROUND OF THE INVENTION

The control of plants on track systems is essential for safety reasons. In particular, the ballast bed has to be cleared and/or kept free of vegetation. The ballast bed is usually flexible and helps to transmit both static and dynamic loads uniformly to the substructure. The innumerable spaces between the individual stones absorb the enormous weight of travelling trains and the impacts like a buffer.

Plants and the humus held by them can block the interspaces over time, and this can put the safety of the trains at considerable risk. Therefore, growth of all kinds has to be kept away from the track systems for safety reasons.

Plant growth on track systems is usually prevented by the application of herbicides. So-called spray trains are special trains for treating stretches of rail tracks. They serve to apply herbicides so that weeds do not grow on the ballast bed.

The quantity of herbicides applied should be kept as low as possible both for environmental reasons and for cost reasons. Camera systems with a connected image analysis system can be used in order to identify plants in the track bed and to control them in a targeted manner EP1521885B1 discloses, for example, an apparatus for weed control for a rail vehicle, which apparatus comprises a camera which identifies weeds and is connected to a computer which identifies weeds. The described apparatus can be used in order to treat with herbicide only those sections of track in which weed growth has been established by means of the camera and computer. Sections of track which are free of weeds do not have to be treated.

The components which are used for controlling weeds in a spray train usually have a certain inertia. The camera system with a connected image analytics system requires a certain time in order to analyse the images recorded during travelling. Further time is required in order to actuate pumps and valves for applying herbicide. Furthermore, a minimum amount of herbicide has to be applied per unit area in order to achieve the desired effect; the more quickly the train travels, the more quickly this quantity has to be provided and applied as accurately as possible. A high speed of the train can lead to quantities of herbicide which are applied swirling and not reaching where they should reach.

All of this leads to a spray train usually being operated at a low speed of approximately 20 km/h. During the time over which a spray train is located on a section of track, no other train can move on said section at a high speed. A slowly travelling spray train therefore leads to a certain blockage of sections of track.

Proceeding from the described prior art, the objective technical problem was that of reducing the time required for controlling weeds on track systems.

SUMMARY OF THE INVENTION

According to some embodiments of the invention, an apparatus for weed control for a rail vehicle comprises
   means for identifying one or more locations along a stretch of track, at which location/locations measures for weed control should be carried out, and
   control means for weed control at the identified location/the identified locations,
characterized in that the identification means and/or the control means are set up such that, while the rail vehicle is travelling, they execute a movement which is directed opposite to the movement direction of the travelling rail vehicle.

According to some embodiments of the invention, a method comprises
   moving a rail vehicle along a stretch of track in a movement direction,
   identifying at least one location at which a measure for weed control should be carried out,
   carrying out the measure for weed control at the at least one location,
characterized in that, during the movement of the rail vehicle, means for identifying the at least one location and/or control means for carrying out the measure for weed control at the at least one location execute a movement which is opposite to the movement direction of the rail vehicle in order to reduce the relative speed between the identification means and/or the movement means and the at least one location.

According to some embodiments of the invention, a rail vehicle comprises one or more inventive apparatuses.

The invention will be explained in more detail below, according to some embodiments, without distinguishing between the subjects of the invention (apparatus, method, rail vehicle). Instead, the following explanations are intended to apply in an analogous manner to all of the subjects of the invention, irrespective of the context (apparatus, method, rail vehicle) in which they are made.

According to some embodiments, the invention serves to control weeds using a moving rail vehicle.

The term "weed" (plural: weeds) is intended to be understood to mean plants in track systems which develop there, for example, from the soil seed potential or are air-borne. The term is not limited to foliage in the strict sense, but also comprises grasses, ferns, mosses or woody plants.

Since weeds present a safety risk for the rail vehicles and the people, animals and/or goods travelling therein, the said weeds should be controlled.

The term "control" is intended to be understood to mean all measures for preventing the emergence and/or the propagation of and also measures for reducing weeds.

The term "rail vehicle" is intended to be understood to mean any vehicle which can be moved on rails along a stretch of track from one location to another location by means of drive means. The rail vehicle is preferably a train (for example a spray train) or a Unimog. The rail vehicle can preferably be moved at a speed of at least 30 km/h, preferably at least 40 km/h, further preferably at least 50 km/h, by means of the drive means.

The rail vehicle has identification means and control means for the purpose of controlling weeds. The identification means can serve to identify at least one location at which a measure for controlling weeds should be carried out. The control means serve to carry out a measure for controlling weeds. Identification means and/or control means are fitted to the rail vehicle such that they can execute a movement in a direction which is opposite to the movement direction of the rail vehicle. In the text which follows, control means and/or identification means of this kind are also called moving control means and/or moving identification means.

According to some embodiments, the rail vehicle moving in one direction executes a relative movement in relation to the stationary track system and the plants located therein. Owing to the movement of the movably designed control means and/or identification means in the opposite direction, the relative speed of the control means and/or identification means in relation to the stationary track system and, respectively, the plants located therein is reduced. If the control means and/or identification means move at the same speed as the rail vehicle, 100% of the travelling speed is compensated for. The compensation of the travelling speed preferably lies in the range of from 10% to 90%, even more preferably in the range of from 20% to 80%.

According to some embodiments, the rail vehicle travels in one direction while the control means execute a movement in the opposite direction and in the process carry out a measure for controlling weeds.

According to some embodiments, the rail vehicle travels in one direction while the identification means execute a movement in the opposite direction and in the process identify locations at which a measure for controlling weeds is to be carried out.

According to some embodiments, the rail vehicle moves in one direction while the identification means execute a movement in the opposite direction and in the process identify locations at which a measure for controlling weeds is to be carried out, and the control means likewise execute a movement in the opposite direction and in the process execute a measure for controlling weeds at the identified locations.

According to some embodiments of the present invention, weed control is performed by applying one or more herbicides. The said herbicides may be selective herbicides which kill certain plants in a targeted manner, or so-called total herbicides which act against a very large number of plants. In some embodiments, a combination of selective and total herbicides may be used. The preferably moving control means are preferably spray nozzles which are connected to a container containing a herbicide formulation by means of at least partially flexible lines.

According to some embodiments of the present invention, weed control is performed by flaming. The preferably movably designed control means are preferably one or more nozzles from which a combustible material can emerge, it being possible for the said combustible material to be induced to burn by means of an ignition apparatus.

According to some embodiments of the present invention, weed control is performed by freezing, for example by applying liquid nitrogen. The preferably movably designed control means are preferably one or more nozzles from which liquid nitrogen can be dispensed.

According to some embodiments of the present invention, weed control is performed by the action of electromagnetic radiation, for example by x-ray radiation, ultraviolet radiation, infrared radiation, microwave radiation or strongly focused visible radiation, for example by means of laser radiation. The preferably movably designed control means are preferably means for emitting radiation in the direction of plants which are located on the track system. These means may be radiation sources for electromagnetic radiation. In some embodiments, said means are means with which electromagnetic radiation is guided in a defined direction, such as mirrors, lenses and/or prisms or the like, for example.

According to some embodiments of the present invention, weed control is performed by the application of current. The preferably movably designed control means are preferably electrodes through which an electric current can be made to flow upon contact with a plant, the said electric current flowing at least partially through parts of the plant.

According to some embodiments, a combination of two or more of the said weed control measures is also feasible.

According to some embodiments, the measures for weed control are performed as a rail vehicle travels along a stretch of track.

According to some embodiments, the weed control is preferably performed at a speed of at least 30 km/h, preferably at least 40 km/h, even more preferably at least 50 km/h.

In some embodiments, a weed control measure takes a certain amount of time. For example, a minimum energy in the form of electrical energy or thermal energy or electromagnetic energy has to be introduced into a plant in order to kill the said plant. In some embodiments, for example, a minimum contact time between the plant and an electrode has to be maintained in order to reach this minimum energy. In some embodiments, the plant has to be exposed to radiation, for example, for a minimum period of time in order to reach the minimum energy. In some embodiments, valves require a certain amount of time in order to open and herbicides require a certain amount of time in order to be expelled from a nozzle.

Furthermore, it is conceivable that the high relative speed between control means and weeds which results owing to the travelling rail vehicle has a negative influence on the control measure. For example, it is conceivable that the airspeed which increases as the speed of the rail vehicle increases leads to undesired distribution of the sprayed herbicide.

Therefore, according to some embodiments of the invention, the relative speed between the control means and the weeds which are to be controlled is reduced owing to a movement of the control means opposite to the movement direction of the rail vehicle.

For example, according to some embodiments, it is feasible that the control means are mounted in a movable manner on a rail on the rail vehicle. While the rail vehicle moves in one direction (for example "forwards"), the control means which are mounted on the rail can move in the opposite direction ("backwards"), in a manner driven by a motor for example, on the rail and perform a measure for weed control with this movement.

In some embodiments, the rail is closed and, after a distance along which the control measure is executed, leads back to the start again. The rail could be designed, for example, in the form of an "elongate zero". An "elongate zero" has two parallel straight sections which are connected to one another by means of two preferably semicircular bends. On one of the straight sections, the control means move opposite to the movement direction of the rail vehicle and in the process execute a control measure. The said control means are then guided onto the second straight section via the first bend and move on the second straight section in the same direction as the rail vehicle. During this movement in the travelling direction, the said control means preferably do not execute a control measure. The said control means then reach the second bend and are guided onto the first straight section again by the second bend.

According to some embodiments, a plurality of control means are guided on the inherently closed rail, so that there is always at least one control means on a straight section on which the control means moves opposite to the travelling direction of the rail vehicle. In this way, at least one control means is always in use.

According to some embodiments, the control means may be fastened to a circumferential support, as is known, for example, in the case of tracked vehicles or escalators.

According to some embodiments, in addition to the lateral movement of the control means, the movement of the control means may include a pivoting movement. For example, in some embodiments, a source of electromagnetic radiation may pivot against the travelling direction while the rail vehicle is travelling, so that, for example, a region of the track bed beneath the rail vehicle is irradiated during the pivoting period. In some embodiments, a plurality of control means may be used which pivot to and fro in parallel, so that at least one control means always performs a pivoting movement opposite to the travelling direction of the rail vehicle. In some embodiments, a rotation movement instead of a pivoting movement may be used.

According to some embodiments, the weed control is carried out at one or more locations along a stretch of track for which location/locations weed control has been displayed.

Therefore, according to some embodiments, a location at which weed control should be performed is first determined (identified) and then the corresponding weed control is performed at this location. A further location along the stretch of track can then be determined (identified), and corresponding weed control is performed at the further location. A location is usually a section of track in which weeds have been discovered and/or a section of track in which there is a risk of weeds occurring.

According to some embodiments of the present invention, a location is identified by a camera system which is equipped with means for image analysis. The camera system (or parts thereof, such as the camera optics for example) is (possibly movably) fastened to the rail vehicle and records images of the track system during travelling. The recorded images are analysed for the presence of plants or parts of plants. If a plant is identified in an image, the location at which the image had been recorded and at which the plant is located is determined (identified) as a location at which weed control should be performed.

In some embodiments, plants are identified as such by the camera system. In some embodiments, the camera system is designed such that it can identify an individual plant species.

According to some embodiments, in order to record an image of an object, light which is incident on the object and is returned (reflected/scattered) is detected by an image sensor (for example CCD sensor, CMOS sensor) and converted into electrical signals. In some embodiments, images of the area surrounding a rail vehicle are generated as the rail vehicle moves at a relative speed in relation to the environment. In order to avoid motion blur, the exposure time can be matched to the speed. The greater the relative speed, the lower the maximum exposure time which may not be exceeded in order to comply with a prespecified (tolerable) motion blur.

A shorter exposure time can be compensated for, for example, by a higher quantity of light. According to some embodiments of the present invention, a higher speed of the rail vehicle is compensated for by a relative movement of the camera opposite to the movement direction of the rail vehicle. To this end, the camera can be movably mounted, for example, on a rail on the rail vehicle. As the rail vehicle travels in one direction, the camera is moved, for example in a manner driven by a motor, in the opposite direction in order to reduce the relative speed between the camera and the area surrounding the rail vehicle (for example track bed).

In some embodiments, during the movement, the camera covers a distance opposite to the movement direction of the rail vehicle and, during this movement, generates a plurality of image recordings of the surrounding area (for example the track bed). The camera is then moved back to its original location again. During this return movement, the relative speed between the camera and the area surrounding the rail vehicle is naturally greater than the relative speed between the rail vehicle and the surrounding area. Therefore, preferably no image recordings of the surrounding area are generated during this return movement. However, in order that the rail vehicle is not "blind" during this return movement, at least one further camera can be used, which camera alternates with the first camera for generating image recordings.

In some embodiments, in addition to the lateral movement of the camera(s), the movement of the camera(s) may include a pivoting movement. For example, in some embodiments, a plurality of images of the object which is intended to be identified or specified as a weed are recorded from different viewing angles for the purpose of identifying weeds or the weed species present. For example, according to some embodiments, an object which has, for example, a green colour is identified in a first image which has been recorded by a camera from one viewing angle. As is known, a large number of plants at least partially have a green colour, which is attributed to the presence of chlorophyll. In some embodiments, the camera pivots against the travelling direction of the rail vehicle in order to generate at least one further image recording of the object from a different viewing angle for the purpose of ensuring that the green object is a plant or for identifying the plant species present. In some embodiments, a three-dimensional reproduction of the object is generated from a plurality of image recordings from different viewing angles. The more image recordings of an object generated from different viewing angles, usually the higher the accuracy for identifying the object.

According to some embodiments of the present invention, the at least one location at which weed control should be performed is not determined during travelling of the rail vehicle, but rather in advance, and the fact that the previously defined location has been reached is (merely) displayed during travelling of the rail vehicle. For example, in some embodiments, remote sensing data may be used in order to identify locations along stretches of track on which weeds are growing.

Remote sensing data is digital information which is acquired from a distance, for example of the Earth's surface by satellites. In some embodiments, use of aircraft (unmanned (drones) or manned) may be used for recording remote sensing data.

In some embodiments, remote sensing data is analysed for the presence of weeds in the region of the rail network of a rail operator and the geocoordinates of locations at which weeds have been identified are detected. As the rail vehicle moves along a stretch of track in which at least one such location is located, the respective position of the rail vehicle is monitored by means of a position determining system (for example GPS-assisted). As the rail vehicle approaches a location of this kind, the preparations for weed control are performed. If the position determining system identifies that the rail vehicle is located at a location of this kind, the weed control measure is executed.

However, it is also conceivable that there is a digital map on which locations at which specific measures for weed control should not be carried out are listed. For example, it is conceivable that herbicides must not be applied in some regions along a stretch of track for environmental or water protection reasons. It is likewise conceivable that electrical energy must not be used in order to kill plants in some locations, for example because sensitive electrical or electronic installations which can be disturbed or damaged by the use of electrical energy are located in the vicinity. Therefore, according to some embodiments, those locations at which a weed control measure should be interrupted are displayed (identified), while the measure is performed at all other locations.

BRIEF DESCRIPTION OF THE DRAWINGS

The invention will be explained in more detail below with reference to figures, without the invention intending to be restricted to the features and combinations of features shown in the figures, in which.

DETAILED DESCRIPTION OF EXEMPLARY EMBODIMENTS

Figure 1:
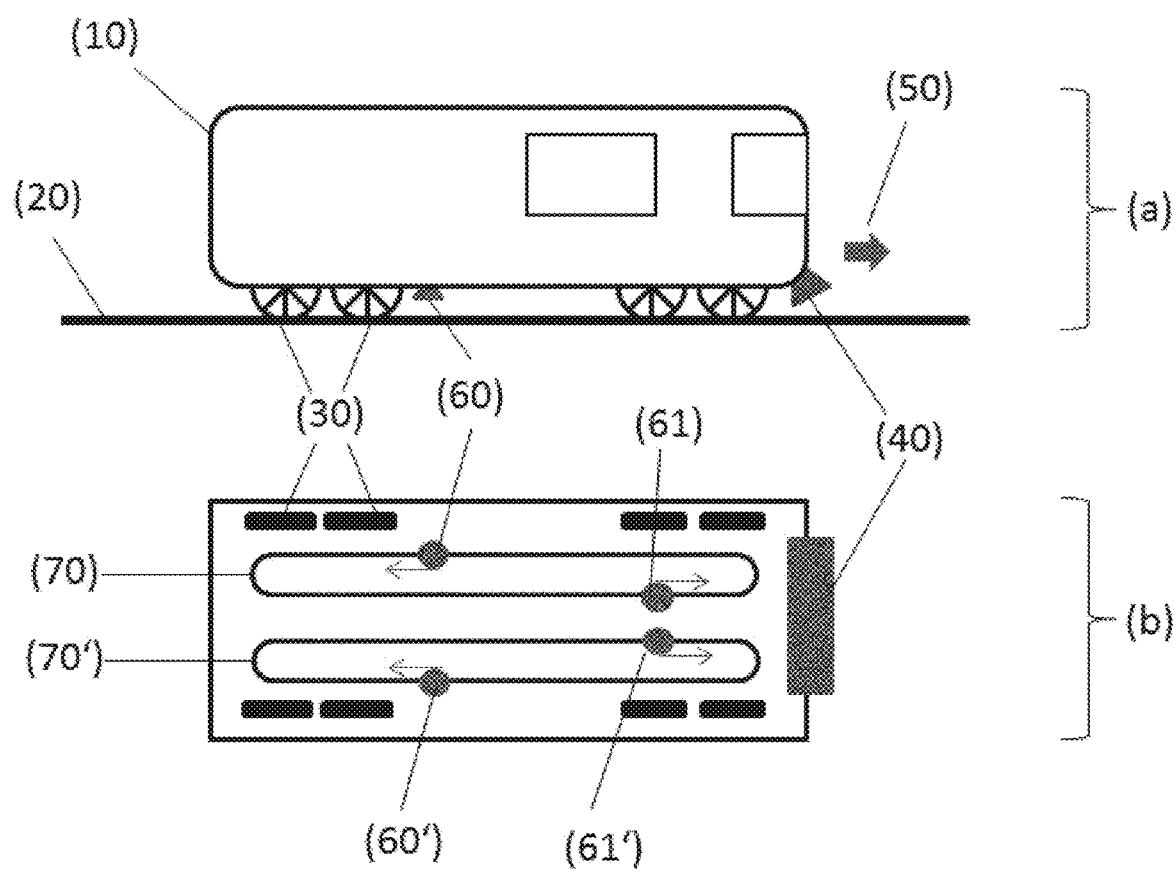
FIG. 1 schematically shows a rail vehicle equipped with an apparatus according to some embodiments of the invention.

The rail vehicle (10) shown in FIG. 1 is illustrated from one side (a) and from below (b). The said rail vehicle moves in a direction (50) on rails (20) by means of wheels (30). A camera system (40) by way of which the track bed can be examined for the presence of weeds is provided. If weeds or a specific weed are/is identified by means of the camera system, a control means is activated. In this embodiment, weed control is performed by the application of a herbicide. The herbicide is applied to the track bed by means of spray nozzles (60, 60', 61, 61'). FIG. 1 shows two spray nozzles (60, 60') which move on rails (70, 70') in a direction which is opposite to the movement direction (50) of the rail vehicle (10). These spray nozzles (60, 60') apply herbicide to the track bed as they move in the said direction. During this time, the spray nozzles (61, 61') move on the same rails (70, 70') but in the direction (50) of the rail vehicle and do not apply herbicide in the process. The said spray nozzles apply a herbicide only when they have reached the respectively outer straight section beyond the bends in the rails and execute a movement opposite to the direction (50) of the rail vehicle. The spray nozzles (60, 60') then move in the direction (50) of the rail vehicle to the inner straight section and do not perform application during this movement.

Figure 2:
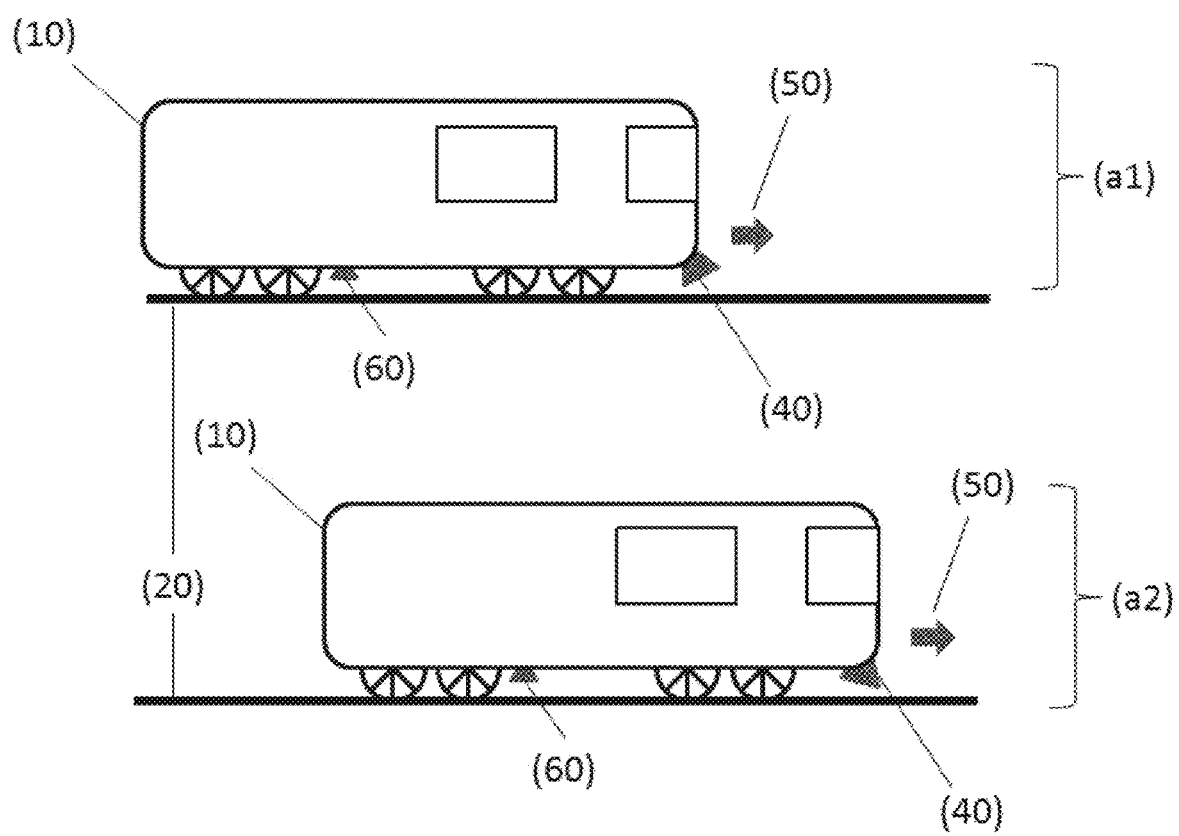
FIG. 2 schematically shows a further rail vehicle equipped with an apparatus according to some embodiments of the invention.

The rail vehicle (10) shown in FIG. 2 moves in a direction (50) on rails (20). The rail vehicle is equipped with identification means (40) in the form of a camera. In the upper illustration (a1), the camera is looking at a section of track in the travelling direction (50). In the lower illustration (a2), the rail vehicle is shown at a later moment; it has moved slightly to the right in relation to the position in the illustration (a1). During this movement, the camera (40) has completed a pivoting movement opposite to the movement of the rail vehicle (to the rear); in the illustration (a2), the camera is directed to the left. During the pivoting movement, the camera takes one or more image recordings of the track bed in order to identify weeds. If a weed is identified, a spray nozzle (60) is prompted to apply a herbicide when the weed is in the application range of the spray nozzle. After the pivoting movement to the rear, the camera will perform a pivoting movement forwards into its starting position in order to then once again pivot to the rear, and so on. While pivoting forwards, said camera does not take any image recordings. A plurality of cameras are preferably provided, which cameras alternately pivot from front to rear and back, wherein at least one camera always performs a pivoting movement against the movement direction of the rail vehicle and in doing so generates one or more image recordings of the track bed in order to identify weeds.

The invention claimed is:

1. An apparatus for weed control for a rail vehicle, comprising:
    an identification system for identifying one or more locations along a stretch of track, upon which the rail vehicle moves, for weed control,
    a weed control system for applying weed control at the identified one or more locations, and
    a rail fixable to the rail vehicle, the rail configured to receive one or both of the identification system and the weed control system,
    wherein,
        one or both of the identification system and the weed control system are configured to move upon the rail in a direction that is opposite to a movement direction of the rail vehicle upon the stretch of track, and
        the rail permits at least a portion of one or both of the identification system and the weed control system to carry out a movement upon the rail lateral to the movement direction of the rail vehicle.

2. The apparatus of claim 1, wherein the weed control system comprises nozzles.

3. The apparatus of claim 1, wherein the weed control system comprises spray nozzles for applying one or more herbicides.

4. The apparatus of claim 1, wherein the weed control system comprises electrodes for applying an electric current upon contact with a plant so that the electric current flows at least partially through the plant.

5. The apparatus of claim 1, wherein the weed control system comprises at least one emitter for emitting radiation in a direction of plants located on the track system.

6. The apparatus of claim 1, wherein the identification system comprises one or more cameras that are connected to a computer system for analysing images.

7. A rail vehicle comprising one or more apparatuses of claim 1.

8. The rail vehicle of claim 7, wherein the one or more apparatuses are mounted on an underside of the rail vehicle.

9. The apparatus of claim 1, wherein the rail is a closed loop.

10. The apparatus of claim 1, wherein the rail permits:
    movement of one or both of the identification system and the weed control system upon the rail in the same direction as the movement direction of the rail vehicle upon the stretch of track,
    movement of one or both of the identification system and the weed control system upon the rail in the opposite direction as the movement direction of the rail vehicle upon the stretch of track, and movement of one or both of the identification system and the weed control system upon the rail lateral to the movement direction of the rail vehicle upon the stretch of track.

11. The apparatus of claim 1, wherein at least a portion of one or both of the identification system and the weed control system is configured to pivot.

12. The apparatus of claim 1, wherein at least a portion of one or both of the identification system and the weed control system is configured to rotate.

13. A method comprising:
moving a rail vehicle upon a stretch of track in a movement direction, the rail vehicle having a rail fixed thereto,
identifying, via an identification system, at least one location for weed control, and
applying, via a weed control system, the weed control at the at least one location,
wherein,
the rail is configured to receive one or both of the identification system and the weed control system,
during the movement of the rail vehicle, one or both of the identification system and the weed control system move upon the rail in a direction that is opposite to the movement direction of the rail vehicle upon the stretch of track, and
at least a portion of one or both of the identification system and the weed control system carries out a movement upon the rail lateral to the movement direction of the rail vehicle upon the stretch of track.

14. The method of claim 13, wherein the rail vehicle moves at a speed of at least 30 km/h while the weed control system applies the weed control.

15. The method of claim 13, wherein the rail forms a closed loop.

16. The method of claim 13, wherein at least a portion of one or both of the identification system and the weed control system carries out a pivoting movement opposite to the movement direction of the rail vehicle upon the stretch of track.

17. The method of claim 13, wherein one or both of the identification system and the weed control system comprise a plurality of portions that carry out a rotation movement and a portion of the plurality of portions that is located closest to the track bed carries out a movement opposite to the movement direction of the rail vehicle upon the stretch of track.

18. The method of claim 13, wherein the rail permits:
movement of one or both of the identification system and the weed control system upon the rail in the same direction as the movement direction of the rail vehicle upon the stretch of track,
movement of one or both of the identification system and the weed control system upon the rail in the opposite direction as the movement direction of the rail vehicle upon the stretch of track, and
movement of one or both of the identification system and the weed control system upon the rail lateral to the movement direction of the rail vehicle upon the stretch of track.

19. An apparatus for weed control for a rail vehicle, comprising:
an identification system for identifying one or more locations along a stretch of track, upon which the rail vehicle moves, for weed control;
a weed control system for applying weed control at the identified one or more locations;
a rail fixable to the rail vehicle, the rail configured to receive one or both of the identification system and the weed control system; and
a motor configured to move the identification system, the weed control system, or both upon the rail independent of the movement of the rail vehicle upon the stretch of track;
wherein one or both of the identification system and the weed control system are configured to move upon the rail in a direction that is opposite to a movement direction of the rail vehicle upon the stretch of track.

\* \* \* \* \*